United States Patent
Dekker et al.

(10) Patent No.: US 11,736,315 B2
(45) Date of Patent: Aug. 22, 2023

(54) FLEXIBLE POWER AND DATA INFRASTRUCTURE

(71) Applicant: Essata Technologies Incorporated, Nunica, MI (US)

(72) Inventors: Ted A. Dekker, Norton Shores, MI (US); Gregory A. Swears, Nunica, MI (US)

(73) Assignee: Essata Technologies Incorporated, Nunica, MI (US)

( * ) Notice: Subject to any disclaimer, the term of this patent is extended or adjusted under 35 U.S.C. 154(b) by 0 days.

(21) Appl. No.: 17/588,446

(22) Filed: Jan. 31, 2022

(65) Prior Publication Data

US 2022/0271972 A1 Aug. 25, 2022

Related U.S. Application Data

(60) Provisional application No. 63/153,409, filed on Feb. 25, 2021.

(51) Int. Cl.
*H04L 12/40* (2006.01)
*H04L 12/10* (2006.01)

(52) U.S. Cl.
CPC ........ *H04L 12/40045* (2013.01); *H04L 12/10* (2013.01); *H04L 12/40091* (2013.01); *H04L 2012/40215* (2013.01)

(58) Field of Classification Search
CPC ......... H04L 12/40045; H04L 12/40091; H04L 12/10; H04L 2012/40215
See application file for complete search history.

(56) References Cited

U.S. PATENT DOCUMENTS

| | | | | |
|---|---|---|---|---|
| 10,652,664 | B1* | 5/2020 | Sennett | H04R 5/04 |
| 11,523,216 | B2* | 12/2022 | Tracy | H04R 3/12 |
| 2003/0154276 | A1* | 8/2003 | Caveney | H04L 41/00 709/250 |
| 2005/0044186 | A1* | 2/2005 | Petrisor | A63F 13/12 709/219 |
| 2009/0016216 | A1* | 1/2009 | Ballard | H04L 41/0253 370/230 |
| 2009/0185215 | A1* | 7/2009 | Kreppold | G06F 12/0661 358/1.15 |
| 2015/0326379 | A1* | 11/2015 | Dabiri | H03M 13/253 370/276 |
| 2016/0250939 | A1* | 9/2016 | Shin | B60L 53/305 320/109 |
| 2017/0047696 | A1* | 2/2017 | Li | H01R 31/005 |
| 2019/0013930 | A1* | 1/2019 | Munir | H04L 9/0631 |

OTHER PUBLICATIONS

IEEE, IEEE Standard for Universal Power Adapter for Mobile Devices, 2015, IEEE Computer Society, IEE Std 1823 (Year: 2015).*

* cited by examiner

*Primary Examiner* — Rasheed Gidado
(74) *Attorney, Agent, or Firm* — Carlson, Gaskey & Olds, P.C.

(57) ABSTRACT

A power and data transfer method includes providing a cable assembly for both power and data transmission, transferring power through at least two power conductors of the cable assembly, and transferring data through at least two data conductors of the cable assembly using a serial communication protocol.

14 Claims, 3 Drawing Sheets

FLEXIBLE POWER AND DATA INFRASTRUCTURE

CROSS-REFERENCE TO RELATED APPLICATIONS

This application claims priority to U.S. Provisional Application No. 63/153,409, which was filed on 25 Feb. 2021 and is incorporated herein by reference.

TECHNICAL FIELD

This disclosure relates generally to power and data transfer and, more particularly, to systems that are used to transfer power and data.

BACKGROUND

Buildings and other areas often require both power and data. In an industrial environment, for example, power can be required for machinery and data transfer can be required to help control that machinery. To meet these needs, power distribution systems and data distribution systems have been developed. When power and data requirements for an area change, reconfiguring both the power distribution system and the data distribution system can be challenging.

SUMMARY

In some aspects, the techniques described herein relate to a power and data transfer method, including: providing a cable assembly for both power and data transmission; transferring power through at least two power conductors of the cable assembly; and transferring data through at least two data conductors of the cable assembly using a serial communication protocol.

In some aspects, the techniques described herein relate to a power and data transfer method, wherein the serial communication protocol is a CAN data protocol.

In some aspects, the techniques described herein relate to a power and data transfer method, wherein the CAN data protocol is a CAN FD data protocol.

In some aspects, the techniques described herein relate to a power and data transfer method, wherein the at least two power conductors includes at least two power conductors, wherein the at least two data conductors includes at least six data conductors.

In some aspects, the techniques described herein relate to a power and data transfer method, further including holding the at least two power and the at least two data conductors within a sheath of the cable assembly.

In some aspects, the techniques described herein relate to a power and data transfer method, wherein the cable assembly is a CAT 5 cable assembly.

In some aspects, the techniques described herein relate to a power and data transfer method, wherein the cable assembly is a cable assembly configured to carry class 2 power.

In some aspects, the techniques described herein relate to a power and data transfer method, wherein the transferring of power is a transferring of low-voltage DC power.

In some aspects, the techniques described herein relate to a power and data transfer method, further including terminating the at least two data conductors automatically using a terminating resistor.

In some aspects, the techniques described herein relate to a power and data transfer system, including: a cable assembly having a plurality of conductors; at least two of the conductors are power conductor; and at least two of the conductors are data conductor that transfers data via a serial communication protocol.

In some aspects, the techniques described herein relate to a power and data transfer system, wherein the serial communication protocol is a CAN data protocol.

In some aspects, the techniques described herein relate to a power and data transfer system, wherein the CAN data protocol is a CAN FD data protocol.

In some aspects, the techniques described herein relate to a power and data transfer system, wherein the power conductors are part of a 48-volt bus.

In some aspects, the techniques described herein relate to a power and data transfer system, further including a sheath of the cable assembly, the power conductors and the data conductors held within a sheath.

In some aspects, the techniques described herein relate to a power and data transfer system, wherein the at least two power conductors includes exactly two power conductors, wherein the at least two data conductors includes at least six data conductors.

In some aspects, the techniques described herein relate to a power and data transfer system, further including a terminating resistor that terminates the plurality of conductors.

In some aspects, the techniques described herein relate to a power and data transfer system, further including a line assembly, the line assembly including a profile, at least one line conductor operably coupled to each of the data conductors, and at least one other line conductor operably coupled to each of the power conductors.

In some aspects, the techniques described herein relate to a power and data transfer system, wherein the line conductors are each from 10 to 14 gauge copper wires.

In some aspects, the techniques described herein relate to a power and data transfer system, wherein the profile is a first profile that is metal or metal alloy profile, and further including a second profile within the first profile, and a third profile within the first profile, the second profile holding the at least one line conductor that is operably coupled to each of the data conductors, the third profile holding the at least one line conductor that is operably coupled each of the power conductor.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details exemplary power and data distribution systems, components of such systems, and methods of using the systems and components.

Figure 1:
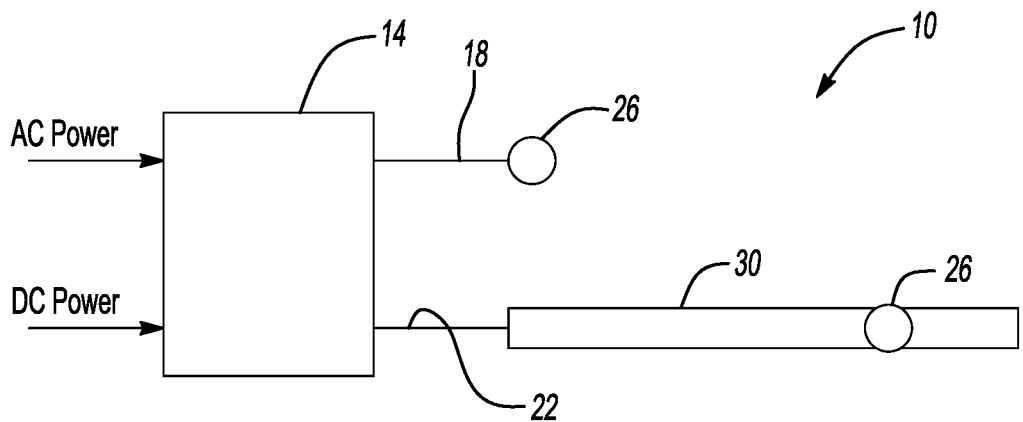
FIG. 1 illustrates a schematic view of an exemplary power and data distribution system.

With reference to FIG. 1, an exemplary power and data distribution system 10 is coupled to a power supply 14. The system 10 can include a first cable assembly 18, a second cable assembly 22, at least one application device 26, and a line assembly 30. The system 10 can be referred to as a network, nanogrid, or infrastructure. The system 10 includes various modules and physical structures. In another example, the system 10 does not include the line assembly 30 and instead includes the power supply 14, the cable assembly 18, and the application device 26.

The power supply 14 can receive AC power, DC power, or both. The power can be provided to the power supply 14 from a grid source. In another example, a battery or a renewable energy source (e.g., wind, solar) provides power to the power supply 14. In some examples, when coupled to both an AC and DC power source, the power supply 14 prioritizes the DC input when available (such as when coupled to a local power storage unit) and reverts to the AC input when the DC input is exhausted.

In an example, a DC power input to the power supply 14 can range from 12 VDC to 380 VDC, and an AC power input can range from 90 VACrms to 488 VACrms, at 50 or 60 cycles per second (Hertz). The power supply 14 electrically isolates the system 10 from other power systems and from the grid source.

In the exemplary embodiment, the first cable assembly 18 is part of a Class 2 circuit, and extend from the power supply 14 to the application device 26. The first cable assembly 18 of the system 10 can transfers power to the application device 26. The application device 26 can also send and receive data communications through the first cable assembly 18. The system 10 can also provide a mounting location for the application device 26. The application device 26 may utilize the power, data communications, and mechanical mounting features of the system 10 in any combination. That is, the application device 26 can use one, two, or all three of the primary functions provided by the system 10.

In the exemplary embodiment, the application device 26 is any device that relies on the system 10 for power, data communications, or mounting. Example application devices 26 include, but are not limited to, WiFi extenders, distributed antenna system components, Bluetooth beacons, air quality sensors, fans, variable speed motors, actuators, temperature sensors, humidity sensors, microphones, noise canceling machines, speakers, cameras, occupancy sensors, window shades, LEDs, daylight sensors, human movement pattern sensors, smoke detectors, and user signaling beacons.

The application device 26 can include a mechanical mounting structure that fixes the application device 26 to a ceiling, for example. The mechanical mounting structure could instead attach the application device 26 to a building structure in the case of an open ceiling where no traditional ceiling system is present. The application device 26 can interface with mounting structures of the ceiling structure, such as a hard ceiling of drywall or plaster.

In an example, the application device 26 connects to the system 10 via a cabled connection. If there is no ceiling structure (i.e., an open ceiling) the application device 26 can be mounted to the system 10.

The second cable assembly 22 and the line assembly 30 can also transfer both power and data. Using the first cable assembly 18, the second cable assembly 22, and the line assembly 30, the system 10 can simultaneously service a plurality of the application devices 26 as shown in FIG. 2.

In the exemplary embodiment, the application devices 26 share common front-end hardware and firmware that enables the application devices 26 to communicate across a data network of the system and to draw power from the system 10.

Figure 2:
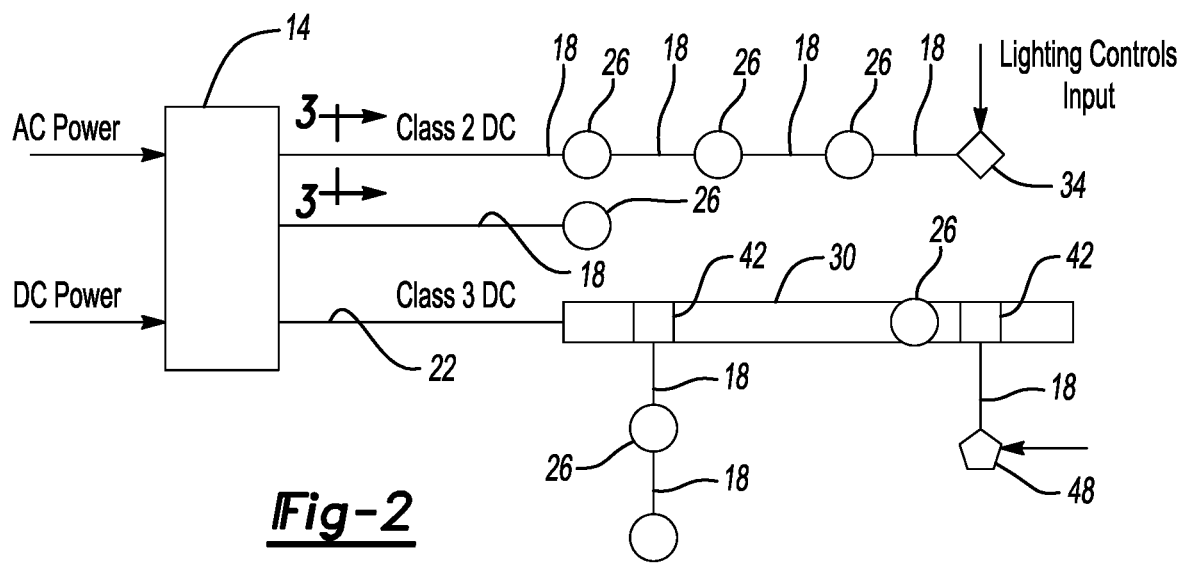
FIG. 2 illustrate a more detailed schematic view of The power and data transfer system of FIG. 1.

In FIG. 2, the system 10 is schematically shown as operably coupled to the application devices 26, along with a light bridge 34, at least one line adapter 42, and a gateway 48. The application devices 26 can be operably coupled together using additional sections of the first cable assembly 18. Another section of the first cable assembly 18 can operably connect one the application devices 26 to the light bridge 34, which can receive control signal inputs from a lighting control interface 38. The light bridge 34 can be considered an accessory that is used with the core devices that establish the system 10. The control signal inputs are interpreted, and digital communications can be communicated through the system 10. As required, at least one of the application devices 26, such as the application devices that are luminaries, can respond.

The line adapter 42 can be operably coupled to the system 10 through the line assembly 30. The line adapter 42 can branch from the line assembly 30 and can provide one or more Class 2 power outputs. The line adapter 42 can include a Class-3 to Class-2 converter to provide the Class-2 output. Sections of a Class 2 type cable, such as sections of the first cable assembly 18, can connect the application devices 26 and 26 to the line assembly 30 or the line adapter.

The gateway 48 can be coupled to the system 10 through the line assembly 30 and can provide a communication interface between the system 10 and an external network. Communications from an external network can be routed through the gateway 48 and to the plurality of application devices 26 and other devices of the system 10. This network connection may be wired or wireless connection.

The system 10 can take the form of three or more different network topologies, including a star, loop, line, or combination thereof, with or without stub lines emanating from each topology. The physical structures of the system 10 can be highly configurable and modular. In the various configurations, conductors can be provided by the system 10 for both power and data transfer. Application devices 26 can be connected in parallel to the power and data conductors to create a wired network.

In an exemplary embodiment, the first cable assembly 18 and the second cable assembly 22 of the system can each be utilized for both power and data transmission.

The specifications for the first cable assembly 18, which is for the Class 2 circuit, can be different than the specification for the second cable assembly 22, which is used with the Class 3 circuit.

Figure 3:
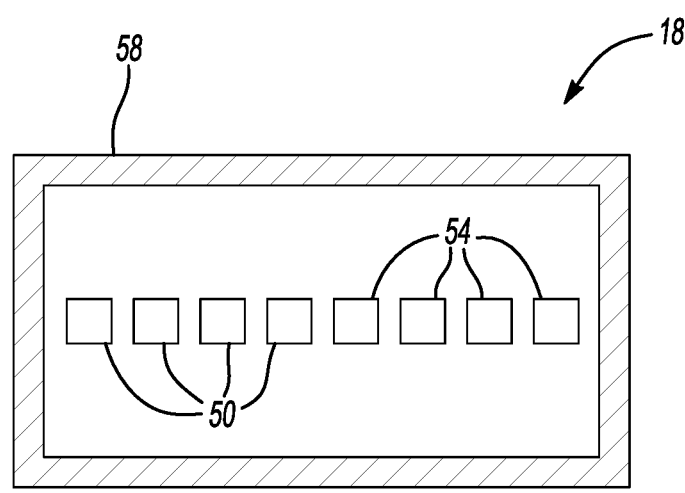
FIG. 3 illustrates a section view through a first type of cable of The power and data transfer system of FIGS. 1 and 2 taken at section 2-2 in FIG. 1.

The first cable assembly 18 can, as schematically shown in the cross-section of FIG. 3, include at least two power conductors 50 through which power can be transferred from the power supply 14 to one or more of the application devices 26. The first cable assembly 18 can additionally include at least two data conductors 54 through which data can be transferred to one or more of the application devices 26. The example first cable assembly 18 is an eight-conductor cable, such as industry-standard CAT 5 or 6 cable. Four conductors are used for power. In some examples, the at least two power conductors 50 and the at least two data conductors 54 are 23 or 24 AWG gauge wire.

The first cable assembly 18, in another example, can includes as few as two conductors. In a two-conductor configuration, both power and data are shared between two conductors. In another example, the first cable assembly 18 can have a six-conductor configuration where two conductors each are used for power, data, and sensing.

A sheath 58 of the first cable assembly 18 holds the at least two power conductors 50 and the at least two data conductors 54. Both power and data are transferred through the first cable assembly 18. Thus, a cable for data transfer and another separate cable for power transfer are not required.

Notably, the data transfer through the at least two data conductors 54 is data transfer via a serial communication protocol. In this example, the serial communication protocol is a Controller Area Network (CAN) data protocol and, more particularly, a CAN Flexible Data Rate (CAN-FD) physical hardware and software protocol. Generally, transfer via CAN is slower than transfer via CAN-FD. Alternatively, data communication may be accomplished using other hardware methods that allow multiple application devices, such as the application device 26, to be connected in parallel on a two-conductor data bus, and that allow random insertion and removal of application devices onto and from any point along the data bus conductors of the first cable assembly 18.

The application devices 26, in this example, receive and send data using a CAN-FD physical hardware configuration and software protocol format. The application devices 26 can include an electronics front-end printed circuit board assembly (PCBA) that contains the CAN-FD physical circuitry (PHY), control microprocessor, required memory, and interface circuitry to transfer data to and/or control the functioning of the respective application device 26. The Front-end PCBA also provides bus management by determining if a termination resistor must be connected across the bus conductors and, if so required, activating switch circuitry to connect the resistor. The Front-end PCBA passes power to the load for the application device 26 and may monitor and meter voltage and current to that load. The Front-end PCBA firmware allows complete over-the-air (wired or wireless) reconfiguration programming of itself.

In the exemplary embodiment, along an entire length of the first cable assembly 18, there are at least two data conductors 54 dedicated for data communication, and between two to six power conductors dedicated for power transfer 56. In some examples, portions of the network include two conductors used for sensing the presence of adjacent modules on the wired network. In alternative embodiments, the power and data conductors could be combined by superimposing data on the power conductors (a technique sometimes referred to as "signal over power or "power over data").

The second cable assembly 22 includes at least two conductors for shared power and data transfer. Like the first cable assembly 18, the at least two conductors are held within a common sheath so that a two separate cable assembles (one for data and one for power) are not required. A typical configuration for the second cable assembly 22 is a four-conductor configuration that uses separate pairs of conductors for power and data communication.

The first cable assembly 18 and the second cable assembly 22 can be terminated within each application device 26 using a hardwired method, such as insulation displacement, or the use of wire nuts or wire crimps within an enclosure or the respective infrastructure device. Alternatively, cable connectors such as an RJ45 may be used for cable termination and connection to an application device 26.

The example power supply 14 provides National Electrical Code power outputs for both Class 2 and Class 3 circuits. Combinations of these circuits create the power network for the system 10.48 Volts DC is a typical power supply output voltage, although output voltages can range from 5 to 60 VDC.

In some embodiments, there is a common voltage shared by all Class 2 and Class 3 circuits of the system 10. In other embodiments Class 3 circuits serve as a power bus having higher voltage and current ratings.

In this embodiment, Class 2 current limiting circuits perform a DC-to-DC conversion to a second, lower DC voltage and then limit the current. In other embodiments, the line adapter 42 makes the conversion.

In an embodiment of the present disclosure, the system 10 is configured to operate within a relatively wide voltage range, such as from 5 to 60 VDC, and the various application devices 26 are able to operate within that voltage range. Within the individual application devices 26, on-board DC-DC conversion can be completed as necessary to support the functions of that application device 26.

The system 10 establishes a wired data network. To facilitate local data communications, the application devices 26 may use the wired network of the system 10.

In some embodiments, data exchange can be accomplished via a wireless radio and associated hardware and firmware integrated within the various application devices 26. In another embodiment, one or more of the application devices 26 may have a direct wired connection to another node outside of the system 10, such as a direct connection via coaxial cable to a cellular distributed antenna system of a building. In this case, those application devices 26 can rely on the system 10 for power and to provide a mounting location, but the primary means of data communication is not the system 10.

As with most data transmission conductors, in order to provide a consistent characteristic impedance by controlling interfering signal reflections, the established CAN bus of the exemplary embodiment requires termination resistance, typically at each end of a linear bus. In a star bus configuration, typically termination resistors are required at the end of each stub (star leg).

Because application devices 26, and other portions of the system 10 that send and receive data on the data bus, may be periodically disconnected and reconnected at a different location, the application devices 26 can sense their position on the data bus and apply a termination resistor as needed. The application devices 26 can include front-end circuitry that accepts a sense input conductor and provides a sense output conductor. These sense conductors can operate on logic voltage levels that are referenced to a common (ground) of the power supply 14. This logic is used to determine if it is necessary to switch in a termination resistor across the bus data conductors. The sense conductors can be daisy-chain-connected between the application devices 26, unlike the power and data conductors, which can be a continuous bus.

Operation of this sense system for a given application device 26 can include first checking the sense input for a signal indicating that another application device is installed on the bus ahead of the given application device 26. Next, the operation checks the sense output for a signal indicating that another application device is installed on the data bus beyond the given application device.

If no signal is detected on the sense input, but a signal is detected on the sense output, the given application device 26 assumes it is the first application on the bus and enables its terminating resistor across the data bus conductors.

If the given application device 26 detects no signal on the sense output, but detects a signal on the sense input, the given application device 26 assumes it is the last given application device 26 on the bus and the enables a terminating resistor across the data bus conductors.

Next, the given application device 26 can place an outgoing logic signal on its sense output to indicate to any other application device 26 that might be subsequently added to the chain that it is present ahead of it on the data bus.

Instead of using separate sensing conductors, the system 10 can include a power line sensing method that automatically senses for data bus termination using the at least two power conductors 50 (i.e., power bus). An example of such a power line sensing method can include a step of having each powered application device measuring an input current flowing through the connector where the DC power is input. The method further includes each powered application device measuring a consumption current that the respective powered application device consumes. Next, the two current measurements are compared. If the input current is greater than the consumption current, the method can assume that power is being passed through to a connected downstream device; in which case no termination resistance is applied across the data conductors. If the input current is equal to the consumption current, the method can assume that there is no downstream powered application device, and a termination resistance can then be applied across the data conductors. The method can be executed by circuit hardware or in firmware code depending on whether the respective powered application service contains a microcontroller or if it does not contain a microcontroller. Some application devices, such as power adaptors" and some LED Drivers, will not contain a microcontroller.

If the given application device 26 detects no signal on both the sense input and the sense output, the given application device 26 assumes it is connected to a line having terminating resistor end caps and no sense conductors. The sense lines can be periodically checked for additions and removals of application devices from the bus, and the terminating resistor is enabled or disabled as appropriate for the situation.

In a configuration where data is exchanged between the system 10 and another system via a direct wired connection, isolating data transmission line impedance systems from each other may be required in order to prevent interference problems between the two transmission line configurations. The isolation can be accomplished utilizing, for example, magnetic or optical isolation physical electrical coupling circuitry.

Through the gateway 48, the data network for the system 10 can connect to several categories of external data networks, such as, for example, a building enterprise network via an ethernet connection. All nodes within of the system 10 can gain connectivity to the building network and the cloud via an internet connection through the gateway 48. Building automation systems are one category of building control system with which connectivity may be enabled by means of an IP (Internet) connection and industry standard protocols including, but not limited to, BACnet/IP. Other building control systems, such as lighting control systems, are able to communicate with nodes on the infrastructure by means of this internet protocol connection, or some other wireless or wired protocol. This communication may be accomplished whether the control system hardware is located within the same building, communicating via the building network, or off-site communication via internet protocol.

There are multiple modes of operation the gateway 48 could perform while facilitating data transfer between an external entity and the local infrastructure network. In an example, the gateway 48 passes raw data from the network of the system 10 to an external network without performing any function to that data. This is done by converting from IP protocol to CAN-FD, and passing the payload between those protocols without any further steps to validate or check the data.

Alternatively, the gateway 48 can perform a filtering function to ensure interoperability between the external control system and application device 26 on the system 10. One or more supported software communication protocols could be selected, either proprietary or industry standard, and the gateway 48 will filter all data communications to ensure only approved message formats and data are transferred. By validating these transmissions, this ensures that both sending control system and recipient Application Device are sharing a common communication protocol, and therefore interoperability is achieved.

An alternative means of external data communication between the system 10 and an external system is through a bridge node, which can receive proprietary or industry standard analog or digital signals from that external system. The system 10 then converts to a digital message on a CAN bus of the system 10. The digital message is intelligible and actionable by the application devices 26 of the system 10.

The bridge node could be the light bridge 34 that receives industry standard lighting control protocols, including but not limited to power over ethernet (POE), 0-10V dimming, 1-10V dimming, pulse width modulation (PWM), digital addressable lighting interface (DALI), leading edge TRIAC dimming, and trailing edge phase cut dimming. The bridging node receives these input signals, then sends a control message on the wired network to the appropriate recipient.

Figure 4:
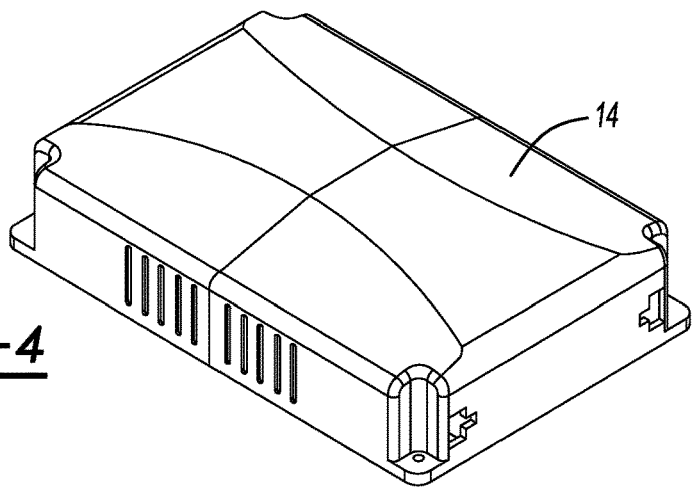
FIG. 4 illustrates a perspective view of a power supply from The power and data transfer system of FIGS. 1 and 2.

FIG. 4 illustrates a perspective view of the power supply 14 used in the system 10 of FIGS. 1 and 2. A primary purpose of the power supply 14 is to provide low-voltage DC power to the system 10. The power supply 14 can include a polymer-based enclosure that has sufficient material properties to enclose exposed AC high voltage components, and that is rated for use in the ceiling plenum and air handling spaces. The polymer-based enclosure typically is a two-part enclosure, closed and secured by means of fasteners or snap engagement features molded into the plastic enclosure.

Extending through the polymer-based walls of the enclosure, so as to be accessible to the user, are multiple mechanical receptacle connectors, which can provide power and data inputs and outputs. The connectors providing DC and AC input power from the building's mains are of sufficient current and voltage rating. The mating plug connectors may be of a type that is overmolded onto a cable, crimped, insulation displacement, or some other manner of suitable connector.

Additional connectors can extend through the enclosure to provide inputs and outputs for the infrastructure cabling. The connectors can include a first style for Class 2 circuits and second, different style for Class 3 circuits. The Class 2 circuit connector can include at least two conductors. One typical configuration incorporates an RJ-45 connector receptacle as the Class 2 circuit connector. The RJ-45 connector includes eight conductors. The Class 3 circuit can connect through the enclosure using Class 3 connectors capable of carrying the current and voltage required by the National Electrical Code. The Class 3 connectors set can include at least two conductors. The Class 2 and 3 connector sets are used as the common interface between the cables 18, 22 and the application devices 26, for example.

The power supply 14 can mount to a ceiling, building structure or the system 10 using fasteners, threaded rod, bar hangers, or some other type of fastener.

The power supply 14 can provide power conversion from AC to DC power. This includes the isolation and current limiting required of Class 2 and 3 circuits. The maximum power output of the power supply 14 can vary based on the configuration.

In an embodiment, electrical hardware and firmware of the gateway 48 are incorporated within the enclosure of the power supply 14. The enclosure size can change (increase) to accommodate this additional hardware. In this embodiment, the power supply 14 then provides the function not only of power conversion but also of facilitating data communication between the system 10 and any external system.

The power supply 14 can provide the circuitry necessary to measure, cache data, and report energy usage. This measurement may be done either by measuring total power draw from all loads on the system 10, connected to the power supply 14, or by measuring power draw from each individual output circuit.

Annunciation can be accomplished via visual or audio beacons. An annunciation signal may be generated during a point of failure, such as the power supply 14 being overloaded, or during commissioning by receiving a command from a higher-level control system for the power supply 14 to identify itself to an occupant in the building by means of a pulsing indicator light or in some other way.

In another embodiment of annunciation, the power supply 14 may signal a user during commissioning or installation, alerting the user to certain configuration or installation errors. One such error may be due to creating an electrical connection between the system 10 and another system that is intended to be electrically isolated form the system 10. In such an example, the power supply 14 could start interfering with the power supply of the other system. The power supply 14 of the system 10 (or the power supply of the other system, can detect this and can signal the user that an improper configuration was made.

In another embodiment of annunciation, an augmented reality application may be used, such as augmented reality application operating on a mobile phone or tablet. When the system 10, which may be partially or fully installed in a ceiling, come into view of a camera integrated within the phone or tablet, the augmented reality application is able to visually recognize each product of the system 10, construct a virtual model of the system, and assist a user in troubleshooting, installing, or reconfiguring the system 10. The device hosting the augmented reality application can, in some examples, connect to the gateway 48 of the system 10 via a wireless connection, and can further interact with the system 10, commanding certain devices to beacon or provide a user signal.

Figure 5:
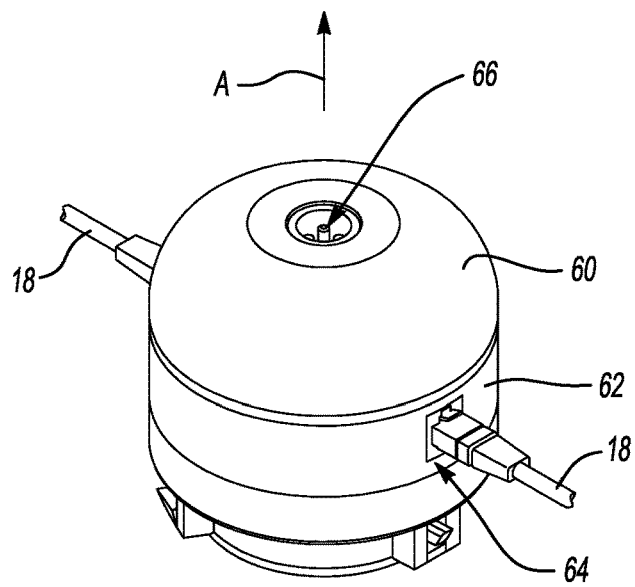
FIG. 5 illustrates a perspective view of a point that can be used in connection with The power and data transfer system of FIGS. 1 and 2.
Figure 6:
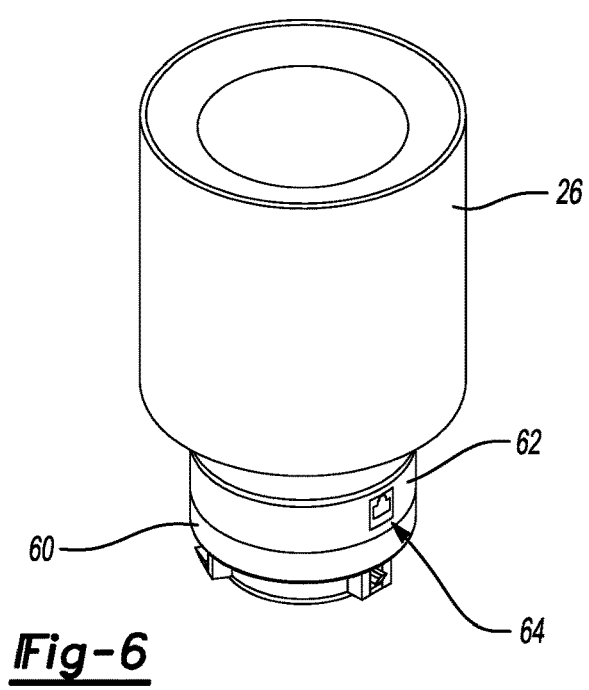
FIG. 6 illustrates a perspective view of the point of FIG. 5 when connected to an application device.

Referring now to FIGS. 2, 5, and 6 an exemplary point 60 can provide a mechanical mounting means for the application device 26. The point 60 consisting of a polymer-based enclosure 62 with one or more Class 2 connectors 64, and one system-specific connectors 66. In FIG. 5, the connector receptacles 64 are showing as engaged with sections of the first cable assembly 18.

The point 60 includes multiple Class 2 connectors 64 to facilitate interconnecting (i.e., daisy chaining) multiple application devices 26 or other devices that operably connect to the system 10 (gateway 48, light bridge 34, etc.). The point 60 can provides power and data connectivity to the application device 26 or other device to operably couple the application device 26 or other device to the system 10.

The system-specific connector 66, in this example, includes is a mating set of circular plug and socket electrical connectors consisting of six electrical contacts each. The locking mechanism between each of the mating connectors may be a twist lock, such as a bayonet coupling, or some other locking means. One of each connector in the mating set is a panel mount type, using a clamp nut or snap features for locking within a panel cutout.

The point 60 can attach to the building structure, typically within the plenum or air handling space. In one embodiment the point 60 attaches to the building structure directly using fasteners, or an attachment mechanism used to attach to a mounting rail system. In another embodiment a mounting bracket, intended to mate with the point 60, attaches either directly to the ceiling structure or to a section of rigid tube. Direct mounting to the ceiling structure may be accomplished by way of mechanical fasteners, adhesives, or an attachment mechanism to a rail system. Mounting to the rigid tube is accomplished in one embodiment by the threaded end of the tube extending through a hole in the mounting bracket or the point 60, then fixing the bracket to the tube using a threaded clamp nut.

The point 60 may attach to the mounting bracket using magnets, detent pins, fasteners, rotational locking mechanism similar to a bayonet lock or common lightbulb Edison socket, or a plastic snap engagement feature molded within the mounting bracket or the point 60 that engages with the other after the point 60 has been fully inserted within the mounting bracket.

A second degree of freedom that the point 60 provides is axial rotation; that is, rotation about the long axis A of the point 60. This may be accomplished by a mechanism within the point 60 that allows for the portion of the point 60 fixed to the mounting bracket or building structure to remain static while the body of the point 60 with all wiring and electrical connectors rotates freely. Alternatively, the features within the mounting bracket that mate with the point 60 are such that they enable the snap tabs to engage and be fully constrained axially and radially, although allow for continuous rotation about the long axis A.

The point 60 enclosure geometry is such that an electrical cord is able to wrap around a portion of the point 60, thus providing a means to contain a length of electrical cord. In one embodiment, the point 60 is static and the electrical cord wraps around a waist portion of the point 60 and the end of the electrical cord is terminated with a connector that plugs into a connector receptacle of the point 60. In another embodiment, a portion of the point 60 that is directly mounted to the mounting bracket or ceiling structure is static, and the portion of the point 60 that encloses all electrical connectors and wiring freely rotates about the axis A. When, for example, the first cable assembly 18 is connected to the point 60 some of the first cable assembly 18 can be wrap around the point 60, capturing a length of cable.

Figure 7:
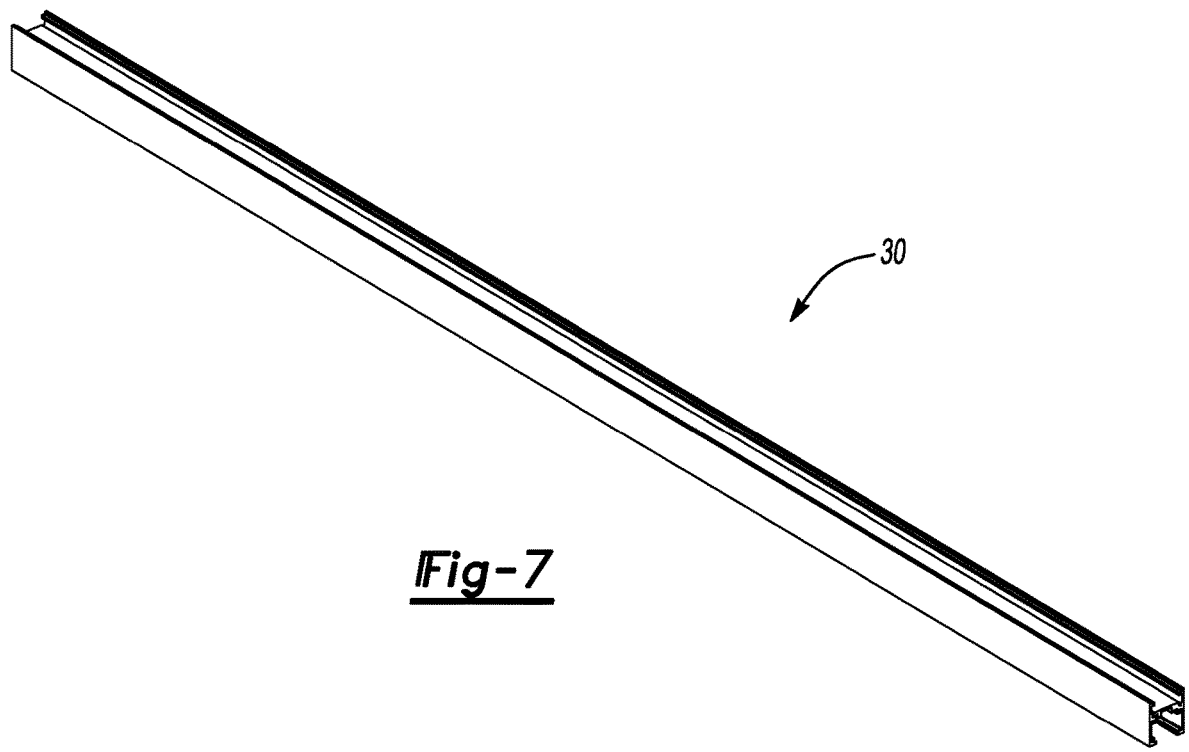
FIG. 7 illustrates a perspective view of a line assembly from the power and data transfer system of FIGS. 1 and 2.
Figure 8:
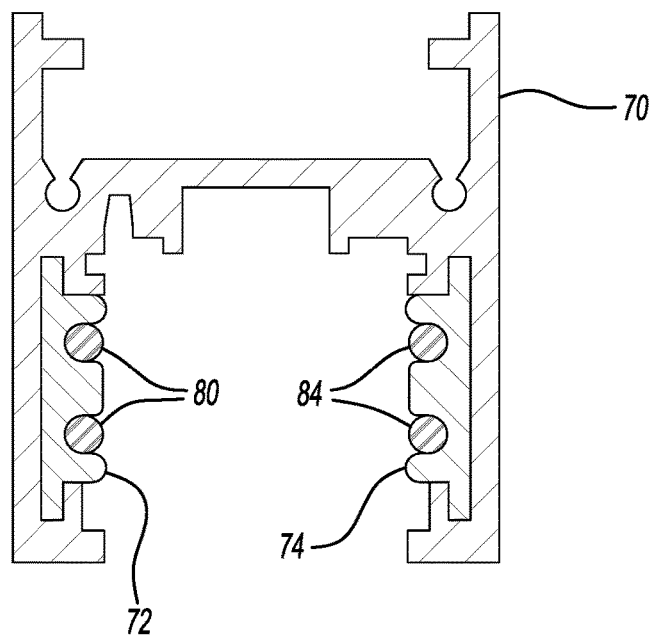
FIG. 8 illustrates a section view of the line taken at section 7-7 in FIG. 7.

Referring now to FIGS. 2, 7, and 8, the line assembly 30 includes, in this example, a first profile 70 made of metal or plastic. In a typical embodiment, the first profile 70 is extruded aluminum. The first profile 70 holds a second profile 72 and a third profile 76 made of an insulating material, such as extruded polyvinyl chloride. The second profile 72 and the third profile 76 electrically insulate while holding conductors. In this example, the second profile 72 holds two line conductors 80 and the third profile 76 holds two other line conductors 84. The line conductors 80 and 84 can be 10 to 14 gauge copper wire.

The line assembly 30 provides a rigid body for mounting, for example, the line adapter 42 and the application devices 26. Additionally, the line assembly 30 can provides a data bus circuit using, for example, the line conductors 80, and a power bus using the other two line conductors 84. The line conductors 80 can be operably coupled to data conductors of the second cable assembly 22. The line conductors 84 can be operably coupled to power conductors of the second cable assembly 22. Power can flow to the line conductors 84 from the power supply 14 by way of the second cable assembly 22.

The second cable assembly 22 can be connected to the line assembly 30 using, for example, the same Class 3 connector used on the DC side of the power supply 14, or can be hardwired to an end feed device of the system 10. The end feed device can be a module comprised of a plastic enclosure of a size and geometry allowing it to fit within the open portion of the line assembly 30. Four metallic contacts on the side of the end feed can make contact and provide an electrical connection by which power and data signals may be sent along the line conductors 80, 84. In an example, the metallic contacts are on an inside and vertically upper side of the end feed.

The Class 3 cable conductors enter the end feed through an opening in the side wall of the enclosure, and make electrical contact, one with each of the four contacts. The end feed is a node that mechanically mounts to a line node and provides mechanical termination of the electrical cable and electrical continuity between that cable and the conductors within the line assembly 30.

Power and data can flow from the power supply 14, through the power conductors 50 and data conductors 54, through the end feed, which operably connects the power conductors 50 and data conductors 54 to the respective line conductors 80, 84. The line assembly 30 then provides a power and data bus as part of the physical structure of the power and data network infrastructure.

The line assembly 30 can be mounted to, for example, a ceiling or wall using a variety of mechanical structures including aircraft cable or a length of rigid tube to suspend the line assembly 30 from the ceiling or building structure. Alternatively, the line assembly 30 could be mounted directly to the ceiling or building structure by means of fasteners or adhesive.

The line assembly 30 can be used with other lines to increase, for example, an effective length of the line. The line assembly 30 can be connected rigidly to the other lines using a rigid connector in an end-to-end configuration, or connected flexibly using a flexible connector section of four-conductor cable.

To attach to the line assembly 30, and to enable power and data connectivity between the second cable assembly 22 and the line assembly 30, a line adapter can be used. The line adapter can include a plastic enclosure of a size and geometry allowing it to fit within the open portion of the line assembly 30. Four metallic contacts similar to those used in the end feed can provide an electrical connection with the power and data bus of the line assembly 30. The line adapter is comprised of a safe electronic low-voltage (SELV) circuit, limiting the current of each output connector as to provide an NEC Class 2 power circuit. For purposes of this disclosure, class 2 power is NEC Class 2 power.

In a first exemplary embodiment of the line adapter, the line adapter includes an enclosure and two Class 2 connector receptacles pass through openings in the side wall of the enclosure. Class 2 cable can connect to these receptacles forming branch lines in the power and data network with which to connect directly to, for example, the application devices 26 using Class 2 connector receptacles, or to other devices like the point 60. In another exemplary embodiment of the line adapter, a system-specific receptacle is used in place of the Class 2 connectors. In yet other embodiments, combinations of Class 2 connectors and System-Specifics could be contained in a single line adapter.

The line adapter and end feed can be polarized, and can be designed to be mechanically unable to mate with the line assembly 30 unless the orientation of the line adapter and end feed are correct as to create positive contact with the correct polarity each of the mating power and data bus contacts and connectors.

Referring again to FIG. 2, the light bridge 34 facilitates operably connecting lighting devices connected to the system 10 and external lighting control systems. The light bridge 34 can include a plastic enclosure of sufficient material properties to safely enclose exposed AC conductors. Input connectors can be provided for lighting control protocols including power of ethernet (POE), 0-10V dimming, 1-10V dimming, pulse width modulation (PWM), digital addressable lighting interface (DALI), leading edge TRIAC dimming, and trailing edge phase-cut dimming. In one embodiment of the Light Bridge, two Class 2 connectors are provided for cabled connection to the infrastructure. In an alternative embodiment, a single System-Specific plug is provided for connection to a point 60 or a line adapter, and thereby a connection to the infrastructure.

The front-end circuitry used by the light bridge 34 is the common design used by any application device 25 intending to be powered by or communicate over the system 10. The light bridge 34 can include a feature by which to signal the user using a visual or audio indicator, to be used in such cases as system commissioning.

One exemplary embodiment of the light bridge 34 operates under two logic configurations. Under the first configuration, the light bridge 34 receives lighting control input commands from a lighting control system via one of the supported industry-standard lighting control protocols. The light bridge 34 then interprets those inputs, and provides a broadcast command to all lights operably coupled to the system 10 to change or maintain their functional output. In the case of a light, this is the photometric output of the luminaire. This broadcast command uses a particular message structure and protocol that is understood and supported by all lights on the network. The second logic configuration is activated when a higher-level controls system is connected to the network, typically by means of the gateway 48. In the case of a networked lighting control system, the networked lighting control system will send individually-addressed commands to the lights. Similarly, that system intends to receive controller inputs from individually-addressable controllers. The light bridge 34 sends an input to this control system with the control signal input received from one of those standard input protocols.

The gateway 48 can include a plastic enclosure that contains electrical circuitry necessary for providing connectivity between external systems and the system. Front-end circuitry used by the gateway 48 can be a common design used by application devices 26 that are powered by or communicate over the system 10. The gateway 48 includes a feature by which to signal the user using a visual or audio indicator, to be used in such cases as system commissioning.

The gateway 48 can communicate with a local building network via, for example, an Ethernet connection. This connection facilitates IP communication to nodes throughout the local network, and the cloud via an internet connection. In addition to wired communication, the gateway 48 can support wireless communication protocols, such as Bluetooth.

Features of some of the disclosed examples include a cable assembly providing CAN FD communication capability as well as a 48 volt bus.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A power and data transfer system, comprising:
a cable assembly having a plurality of conductors, wherein at least two of the conductors are power conductors, and at least two of the conductors are data conductors that transfer data via a serial communication protocol; and
a line assembly operably connected to the cable assembly, the line assembly providing a rigid body for mounting at least one application device,
wherein the line assembly includes a first profile holding a second profile and a third profile, the second profile holding at least one line conductor operably coupled to each of the data conductors, the third profile holding at least one other line conductor operably coupled to each of the power conductors.

2. The power and data transfer system of claim 1, wherein the serial communication protocol is a CAN data protocol.

3. The power and data transfer system of claim 2, wherein the CAN data protocol is a CAN FD data protocol.

4. The power and data transfer system of claim 3, wherein the power conductors are part of a 48 volt bus.

5. The power and data transfer system of claim 1, further comprising a sheath of the cable assembly, the power conductors and the data conductors held within a sheath.

6. The power and data transfer system of claim 1, wherein the at least two power conductors includes exactly two power conductors, wherein the at least two data conductors includes at least six data conductors.

7. The power and data transfer system of claim 1, further comprising a terminating resistor that terminates the plurality of conductors.

8. The power and data transfer system of claim 1, wherein the at least one line conductors are each from 10 to 14 gauge copper wires.

9. The power and data transfer system of claim 1, further comprising a Class 3 connector that connects the line assembly to the cable assembly.

10. The power and data transfer system of claim 1, wherein the first profile is an extruded metal or metal alloy, wherein the second and third profiles are extruded polyvinyl chloride.

11. The power and data transfer system of claim 1, wherein the first provide is aluminum.

12. The power and data transfer system of claim 1, further comprising a line adapter mounted to the line assembly and operably coupled to the line assembly.

13. The power and data transfer system of claim 12, wherein the line adapter includes a Class-3 to Class-2 converter to provide a Class-2 output.

14. The power and data transfer system of claim 1, wherein the line assembly is configured to be suspended from a ceiling.

* * * * *